(12) United States Patent
Hsu (10) Patent No.: US 10,594,092 B1
(45) Date of Patent: Mar. 17, 2020

(54) CONNECTOR MODULE AND SET-TOP BOX

(71) Applicant: Kinpo Electronics, Inc., New Taipei (TW)

(72) Inventor: Ming-Tsung Hsu, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 16/245,226

(22) Filed: Jan. 10, 2019

(30) Foreign Application Priority Data

Sep. 14, 2018 (TW) .............................. 107132381 A (51) Int. Cl.
*H01R 24/48* (2011.01)
*H01R 24/50* (2011.01)
*H01R 103/00* (2006.01)

(52) U.S. Cl.
CPC ............. *H01R 24/48* (2013.01); *H01R 24/50* (2013.01); *H01R 2103/00* (2013.01)

(58) Field of Classification Search
CPC ............. H01R 13/719; H01R 13/6625; H01R 13/6633; H01R 24/48; H01R 24/50; H01R 2103/00
USPC ............. 439/620.05–620.07, 620.09–620.12, 439/620.24, 620.25
See application file for complete search history.

(56) References Cited

U.S. PATENT DOCUMENTS

| | | | | |
|---|---|---|---|---|
| 5,219,305 A | * | 6/1993 | Kawaguchi | H01R 13/7197 29/832 |
| 5,415,569 A | * | 5/1995 | Colleran | H01R 13/7195 439/620.16 |
| 5,546,058 A | * | 8/1996 | Azuma | H03H 7/0115 333/183 |
| 5,647,768 A | * | 7/1997 | Messuri | H01R 13/7195 439/620.09 |
| 5,708,568 A | * | 1/1998 | Ostendorf | H05K 1/0215 174/254 |

(Continued)

FOREIGN PATENT DOCUMENTS

EP    2658137    3/2015

OTHER PUBLICATIONS

Holland Electronics LLC, "CSI-CPE Inline Safety Isolator," accessed Jan. 2019, Available at: http://www.hollandelectronics.com/catalog/upload_file/CSI-CPE%20Isolator%20Data%20Sheet.pdf.

*Primary Examiner* — Gary F Paumen
(74) *Attorney, Agent, or Firm* — JCIPRNET (57) ABSTRACT

A connector module adapted for a set-top box including a shielding case, a first connector disposed outside of the shielding case, an annular capacitor disposed between the first connector and the shielding case, and at least one ferrite core disposed in the shielding case and generating mutual inductance by coupling the shielding case is provided. The first connector being connected to a peripheral cable has a transmission cable penetrating into the shielding case. The annular capacitor is electrically connected between a grounding layer of the transmission cable and a grounding of a first circuit board of the set-top box. The transmission cable is connected to a second connector of the first circuit board after entering the shielding case and penetrating the ferrite core. A high frequency signal from the peripheral cable is transmitted to the first circuit board via the first connector, the transmission cable, and the second connector.

14 Claims, 5 Drawing Sheets

(56) References Cited

U.S. PATENT DOCUMENTS

| | | | | |
|---|---|---|---|---|
| 5,895,293 A * | 4/1999 | Brandberg | H01R 13/7197 | 439/620.05 |
| 5,910,030 A * | 6/1999 | Hollander | H01R 13/719 | 374/E7.005 |
| 6,508,672 B1 * | 1/2003 | Safai | H01R 13/719 | 439/620.05 |
| 7,252,565 B2 * | 8/2007 | Hunter | H01F 38/14 | 439/357 |
| 7,306,466 B2 * | 12/2007 | Reznik | H05K 1/0225 | 174/260 |
| 9,960,542 B2 | 5/2018 | Holland et al. | | |
| 2002/0102884 A1 * | 8/2002 | Pechstein | G01N 27/286 | 439/660 |
| 2003/0032331 A1 * | 2/2003 | Berg | H01R 13/405 | 439/620.22 |
| 2003/0220000 A1 * | 11/2003 | Ward | H01R 13/65802 | 439/108 |
| 2004/0132322 A1 * | 7/2004 | Brandenburg | H01R 13/719 | 439/75 |
| 2015/0011131 A1 * | 1/2015 | Zhou | H01R 13/518 | 439/694 |

* cited by examiner

CONNECTOR MODULE AND SET-TOP BOX

CROSS-REFERENCE TO RELATED APPLICATION

This application claims the priority benefit of Taiwan application serial no. 107132381, filed on Sep. 14, 2018. The entirety of the above-mentioned patent application is hereby incorporated by reference herein and made a part of this specification.

TECHNICAL FIELD

The disclosure relates to a connector module and a set-top box.

DESCRIPTION OF RELATED ART

TV sets have long become one of the must-have home appliances for every household, and many people get information by watching TV programs. In order to explore this business opportunity, many system manufacturers offer a variety of services through TV programs, so that more people can get the demanded services through TV programs. Too many services and functions have gone beyond the original design of the TV set, so products like a set-top box (STB, or video converter box) came into being.

The set-top box is mainly used to convert TV signals, including TV signals of cable TV, satellite TV, terrestrial TV broadcasting and IP/DSL TV. In the past, the set-top box only had a one-way analog video reception function, which can provide functions such as channel selection, channel decoding or encoding. With the increasing demands and the diversification of services provided by system vendors, the current set-top box is developed for two-way interaction and digital multimedia network communication, which can integrate video, voice and data transmission for new service content.

Generally, when an outdoor unit (ODU) receives signals from a satellite and a ground transmission tower through an airborne and/or low earth orbit communication link, and then connects to the outdoor unit via the set-top box to convert the received signal for processing. However, the disaster caused by the change of outdoor environment causes the outdoor high-voltage electric wire to be torn off or the insulator of the electric wire to be stripped, and then the outdoor cable of the protected electronic device is short-circuited, which causes the outdoor high-voltage current to leak into the room and exposes the indoor personnel to the risk of electric shock as well as results in damage to the protected body and other electrical products around it. In addition, in areas where weather is frequently changed, high-voltage surges are often caused by static electricity or lightning, and it is easy to damage the television set via the set-top box. Therefore, at present, additional protection elements are placed on the lines for receiving outdoor unit signals outside the set-top box to prevent high-voltage surges and the influence of the above-mentioned outdoor environment changes on related electronic products. However, such configuration is likely to cause the inconvenience of installation for user or the above-mentioned problem is likely to occur due to neglect.

SUMMARY

The disclosure provides a set-top box, which integrates a connector module with an isolation function and has the effect of isolating a high-voltage current or a surge.

The connector module of the disclosure is adapted for a set-top box, and the set-top box includes a first circuit board. The connector module includes a shielding case, a first connector, an annular capacitor, and at least one ferrite core. The shielding case is used to shield high frequency RF signals. The first connector is disposed outside the shielding case. The first connector has a transmission cable that penetrates the shielding case. The peripheral cable is adapted to dock the first connector. The annular capacitor is disposed between the first connector and the shielding case, and is electrically connected between a ground layer of the transmission cable and the grounding of the first circuit board. The ferrite core is disposed in the shielding case and coupled to the shielding case to generate a mutual inductance. The transmission cable penetrating the shielding case is electrically connected to a second connector disposed on the first circuit board after penetrating the at least one ferrite core. The high frequency signal of the peripheral cable is transmitted to the first circuit board via the transmission cable and the second connector.

A set-top box includes a first circuit board, a shielding case, a first connector, an annular capacitor, and at least one ferrite core. The shielding case is disposed on a portion of the first circuit board. The shielding case is used to shield high frequency RF signals. The first connector is disposed on the first circuit board and outside the shielding case. The first connector has a transmission cable that penetrates the shielding case. The peripheral cable is adapted to dock the first connector to transmit the high frequency signal to the first circuit board via the transmission cable. The annular capacitor is disposed between the first connector and the shielding case, and is electrically connected between the ground layer of the transmission cable and the grounding of the first circuit board. The ferrite core is disposed in the shielding case and coupled to the shielding case to generate a mutual inductance. The transmission cable penetrating the shielding case is electrically connected to a second connector disposed on the first circuit board after penetrating the at least one ferrite core. The high frequency signal of the peripheral cable is transmitted to the first circuit board via the transmission cable and the second connector.

Based on the above, the set-top box is integrated with a connector module, through coordination of the shielding case, the annular capacitor and the ferrite core, the set-top box has the function of isolating the high-voltage current or the surge. That is, when the first connector of the set-top box receives a high-voltage current or a surge, the high-voltage current or surge can be guided away from the set-top box through the coordination of the annular capacitor, the ferrite core and the shielding case, and thus the related electronic components used to process or convert the signal in the set-top box, and even the media playback device connected to the set-top box are protected from the high-voltage currents or surges.

In order to make the aforementioned features and advantages of the invention more comprehensible, embodiments accompanying figures are described in detail below.

DESCRIPTION OF EMBODIMENTS

Figure 1:
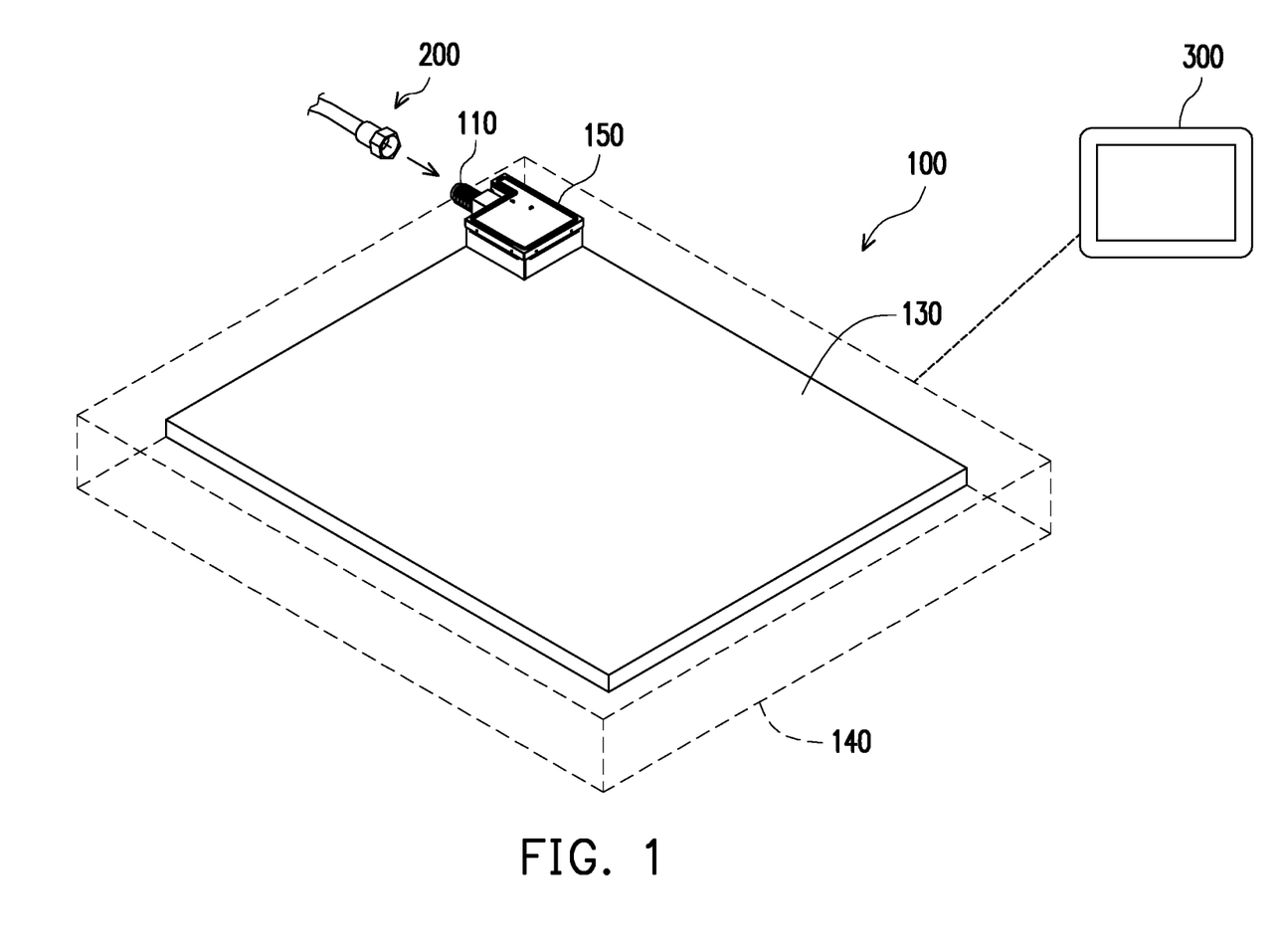
FIG. 1 is a schematic view of a set-top box according to an embodiment of the disclosure.

FIG. 1 is a schematic view of a set-top box according to an embodiment of the disclosure. At the same time, a Cartesian coordinate X-Y-Z is provided to facilitate the description of components. Referring to FIG. 1, a set-top box 100 is, for example, configured to receive a signal transmitted from an outdoor unit via a peripheral cable 200, after being processed and converted by related signal, and then transmitted to a media playback device 300 to provide a user with the desired audiovisual effect. The related art is taught from the prior art and thus not repeated herein. The disclosure only provides descriptions concerning related components provided by the set-top box 100 having the effect of providing protection from the high-voltage current or the surge, and the rest that are not mentioned are omitted altogether in the drawings.

Figure 2:
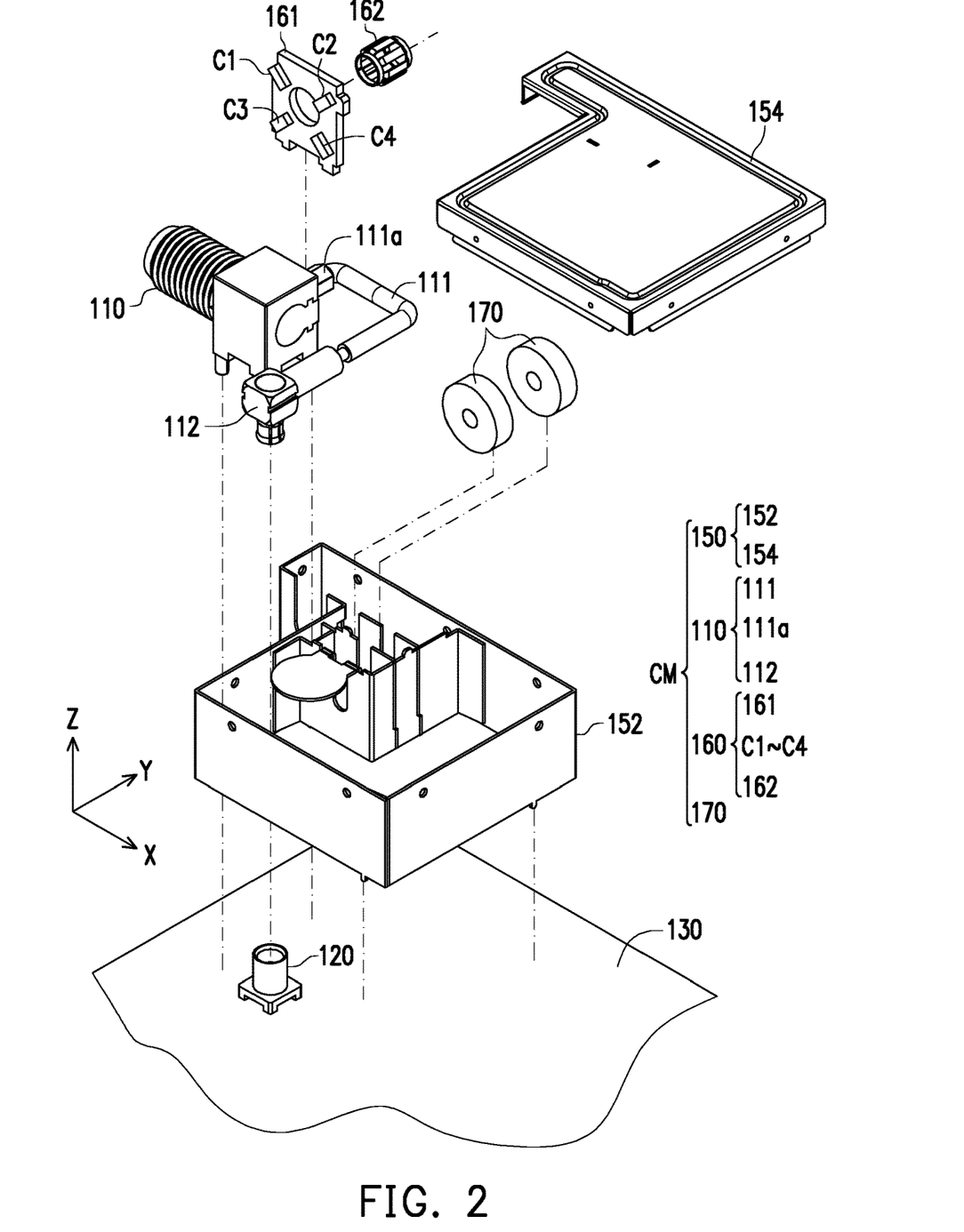
FIG. 2 is a partial exploded view of the set-top box of FIG. 1 at a connector module.
Figure 3:
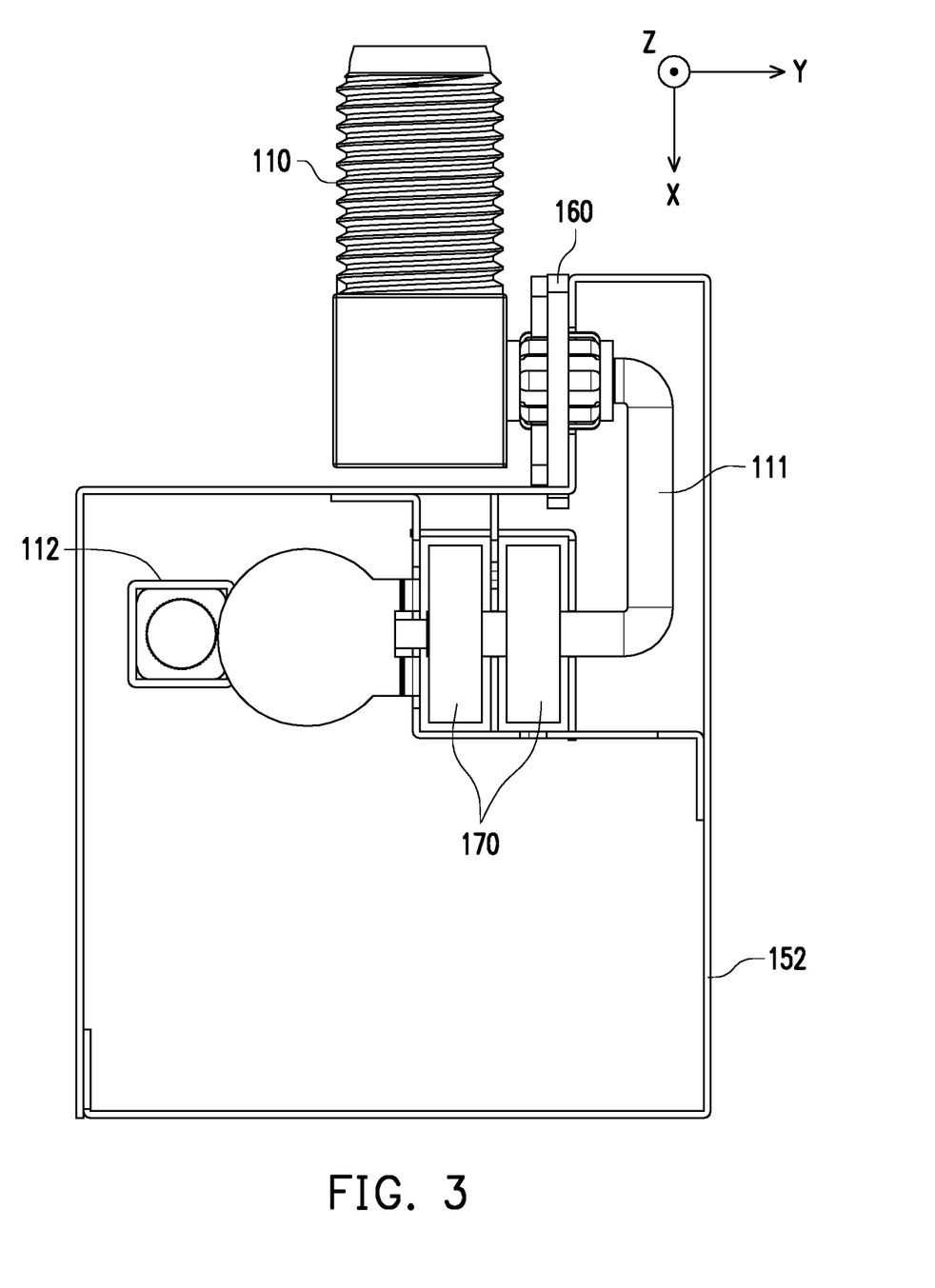
FIG. 3 is a top view of the connector module of FIG. 2.

FIG. 2 is a partial exploded view of the set-top box of FIG. 1 at a connector module. FIG. 3 is a top view of the connector module of FIG. 2. Referring to FIG. 1 to FIG. 3, in the embodiment, the set-top box 100 is resistant to high-voltage current or surge through a connector module CM included therein, thereby preventing the high-voltage current or surge from causing damage to the signal processing elements within the set-top box 100 and even the media playback device 300.

Herein, the set-top box 100 includes a housing 140, a first circuit board 130, a shielding case 150, a first connector 110, an annular capacitor 160, and a ferrite core 170, wherein the shielding case 150, the first connector 110, the annular capacitor 160, and the ferrite core 170 constitute the connector module CM of the set-top box 100. The first connector 110 is exposed from the housing 140 for being connected to an peripheral cable 200. The set-top box 100 further includes a signal processing or converting component (not shown) disposed on the first circuit board 130 but outside the shielding case 150. The peripheral cable 200 receives the signal from the outdoor unit (ODU) and then the signal is transmitted to the signal processing or converting component through the connector module CM, and the processed or converted signal is transmitted to the media playback device 300.

Further, for the connector module CM, the shielding case 150 is formed by a frame 152 and an upper cover 154, and is disposed on the first circuit board 130 for shielding high frequency radio frequency (RF) signals. The first connector 110 is disposed on the first circuit board 130 and outside the shielding case 150. The first connector 110 has a transmission cable 111 for penetrating the shielding case 150. Accordingly, the shielding case 150 can provide an electromagnetic interference (EMI) prevention effect, so that the high frequency signal can be smoothly transmitted from the peripheral cable 200 to the first circuit board 130 through the first connector 110 and the transmission cable 111. Moreover, the annular capacitor 160 is disposed on the first circuit board 130 and located between the first connector 110 and the shielding case 150, and the ferrite core 170 is disposed in the frame 152 of the shielding case 150. The transmission cable 111 penetrating the shielding case 150, the ferrite core 170 and is then electrically connected to the first circuit board 130. Herein, the ferrite core 170 is commonly referred to as a magnetic ring, which is, for example, a nickel-zinc ferrite or a copper zinc ferrite.

Figure 4:
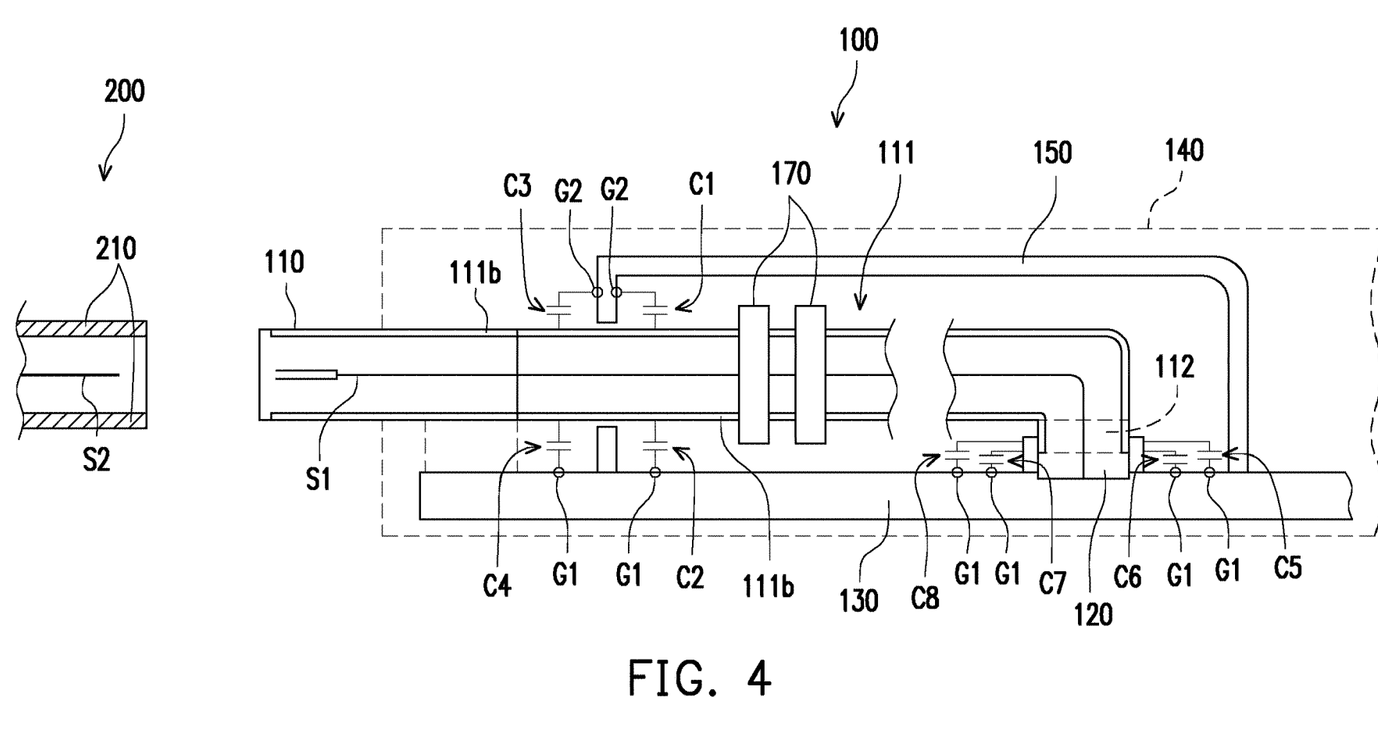
FIG. 4 is a schematic view showing an electrical relationship of a connector module.

FIG. 4 is a schematic view showing an electrical relationship of a connector module. Please refer to FIG. 2 to FIG. 4. As described above, in order to prevent the high-voltage current or the surge from causing damage to the set-top box 100 or even the media playback device 300 connected thereto, the connector module CM of the set-top box 100 needs to have the following technical features to achieve the desired effect.

In detail, the annular capacitor 160 outside the shielding case 150 includes a second circuit board 161 and capacitor elements C1 to C4, wherein the second circuit board 161 is inserted onto the first circuit board 130 and allows the transmission cable 111 to pass through, so that a portion of the capacitor elements C1 to C4 can be electrically connected between a ground layer 111b of the transmission cable 111 and the grounding G1 of the first circuit board 130 through an inner circuit (not shown) passing through the second circuit board 161, and another portion of the capacitor elements C1 to C4 can be electrically connected between the ground layer 111b of the transmission cable 111 and the shielding case 150.

Furthermore, the inner circuit passing through the second circuit board 161 is electrically connected to the ground layer 111b of the transmission cable 111, and the capacitor elements C2 and C4 are substantially electrically connected between the ground layer 111b of the transmission cable 111. The inner circuit passing through the second circuit board 161 is electrically connected to the shielding case 150, such that the capacitor elements C1, C3 are substantially electrically connected between the ground layer 111b and a contact G2 of the shielding case 150. Furthermore, since the shielding case 150 is disposed on the first circuit board 130, the grounding G1 and the contact G2 can be substantially electrically connected through a circuit structure, therefore the grounding G1 and the contact G2 are substantially equipotential, that is, the capacitor elements C1, C3 may also be regarded as being electrically connected between the ground layer 111b of the transmission cable 111 and the grounding G1 of the first circuit board 130.

When the peripheral cable 200 docks the first connector 110, a signal line S2 of the peripheral cable 200 docks a signal line S1 of the first connector 110, and a ground layer 210 of the peripheral cable 200 docks the ground layer 111b of the first connector 110. At the same time, the transmission cable 111 may be regarded as a structural extension of the first connector 110, so that the signal transmission and grounding effects can be consistently and smoothly extended to the second connector 120. Accordingly, when a high-voltage current or a surge is transmitted from the peripheral cable 200 to the first connector 110, through the coordination of the capacitors C1 to C4 and the shielding case 150 as well as the grounding G1 of the first circuit board 130, the high-voltage current or surge can be smoothly guided away from the set-top box 100, so that the connector module CM can provide the same isolation effect as an isolator.

Furthermore, the first connector 110 penetrates into the shielding case 150 through its transmission cable 111, and the transmission cable 111 penetrating the shielding case 150, the ferrite core 170 and is then electrically connected to the second connector 120 of the first circuit board 130, so that the high frequency signal of the peripheral cable 200 is transmitted to the first circuit board 130 through the transmission cable 111 and the second connector 120. Herein, the two ferrite cores 170 are separately disposed in the shielding case 150 by the partition of the frame 152 and coupled with the shielding case 150 to generate mutual inductance. In this manner, the annular capacitor 160 is combined with the effective circuit of the ferrite core 170 and the shielding case 150, so that the connector module CM can cancel and guide the incoming high-voltage current and the surge away. In other words, with the presence of the connector module CM, the set-top box 100 has the effect of isolating high-voltage current or surge and also can prevent EMI. More importantly, the connector module CM is integrated inside the set-top box 100, so that a more convenient operation result is available for the user, and the integrated structure also prevents the user from inadvertently causing damage to the device. Herein, the two ferrite cores 170 are separated by a spacer structure of the frame 152, thereby increasing a magnetism-sensing area between the ferrite core 170 and the shielding case 150. However, the embodiment provides no limitation to the number and configuration of the ferrite cores, which may be adjusted as appropriate depending on the actually required electromagnetic shielding efficiency.

In addition, the transmission cable 111 is further provided with a connector 112 at an end electrically away from the first connector 110. The connector 112 is, for example, a micro-coaxial connector (MCX connector) for docking the second connector 120 disposed on the first circuit board 130, so that the high frequency signal transmitted by the peripheral cable 200 to the first connector 110 and the transmission cable 111 is transmitted to the first circuit board 130. Correspondingly, for the second connector 120 on the first circuit board 130, the connector module CM further includes a plurality of capacitor elements C5-C8 disposed on the first circuit board 130 and electrically connected between the second connector 120 and the grounding G1 of the first circuit board 130, which allows the capacitor elements C5-C8 to serve as a second defense of the connector module CM against the high-voltage current or surge, thus allowing the connector module CM to have further isolation effect.

Based on the above, for the set-top box 100, it integrates the connector module CM having the isolation effect, and in terms of its circuit relationship, an electronic module having the isolation effect is set after the first connector 110 and before the signal processing or converting component, which only occupies a partial configuration of the first circuit board 130 of the set-top box 100 without affecting the arrangement of the electronic components in the set-top box 100, so that a compact configuration and a better space utilization efficiency can be achieved.

Figure 5:
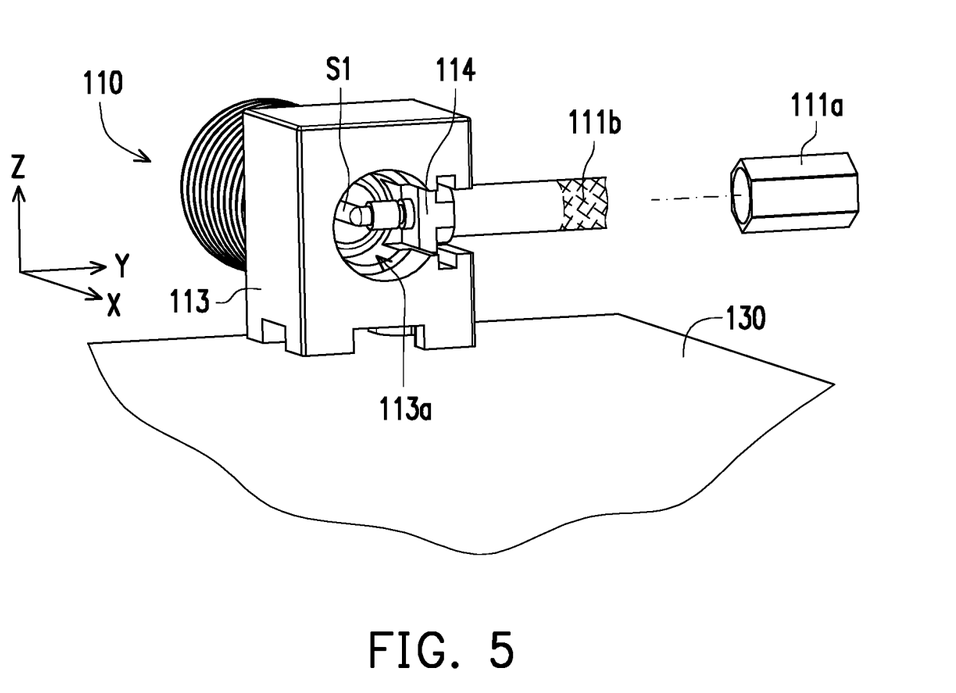
FIG. 5 is an exploded view of a portion of components of a connector module.

FIG. 5 is an exploded view of a portion of components of a connector module.

Referring to FIG. 5, in the embodiment, the first connector 110 is fixed on the first circuit board 130 through a base 113, wherein the base 113 has an accommodating space 113a, and the accommodating space 113a is substantially extended in the Y-axis after extending in the X-axis, so that the signal line S1 of the first connector 110 is also bent and fixed to the base 113 through a structural element 114, and then the transmission cable 111 is used as an extension structure to perform signal transmission and provide grounding effect. It should be noted that, referring to FIG. 2 and FIG. 5, the annular capacitor 160 further includes a metal elastic element 162 for being sleeved on the transmission cable 111 and electrically connected between the ground layer 111b of the transmission cable 111 and the capacitor elements C1 and C4. Herein, as shown in FIG. 5, the transmission cable 111 has the ground layer 111b in the form of a mesh, and in the present embodiment, a bundle element 111a is used first to tighten the outer surface of the transmission cable 111 to allow the bundle element 111a to structurally abut against the ground layer 111b. Thereafter, the metal elastic element 162 having a barrel shape is then disposed through outside the bundle element 111a, so that the two are also structurally abutted. Finally, when the transmission cable 111 passes through the second circuit board 161 of the annular capacitor 160, the inner circuit of the second circuit board 161 can abut against the metal elastic element 162. In this manner, the effect of allowing the capacitor elements C1 to C4 to be electrically connected to the ground layer 111b of the transmission cable 111 is accomplished.

It should also be mentioned that since the related component in the embodiment for isolating the high-voltage current or the high-voltage surge is integrated into the connector module CM of the set-top box 100, viewed from the perspective of FIG. 5, the first connector 110 penetrates into the shielding case 150 through the transmission cable 111 in either one of its left, right, rear or upper directions (except for the lower direction).

Figure 6:
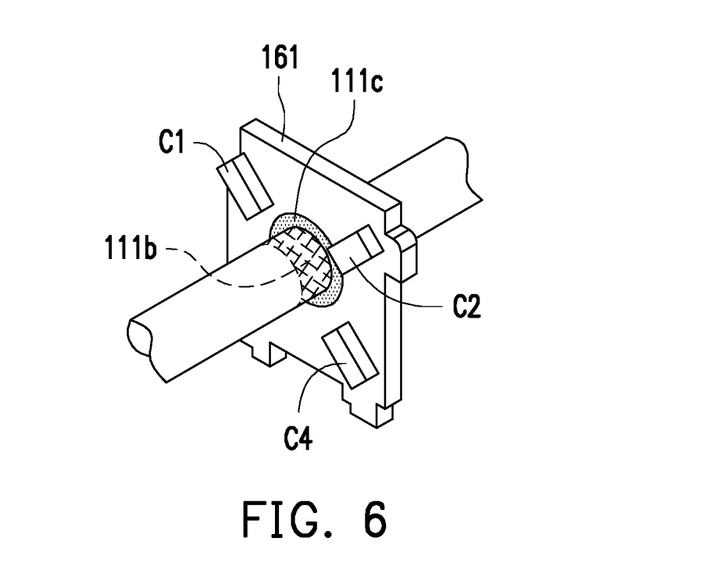
FIG. 6 is a partial schematic view of a connector module according to another embodiment of the disclosure.

FIG. 6 is a partial schematic view of a connector module according to another embodiment of the disclosure. Referring to FIG. 6 and comparing with FIG. 2, the difference between the foregoing embodiment and the present embodiment is that the transmission cable 111 of the present embodiment solders the ground layer 111b with the inner circuit of the second circuit board 161 through a solder material 111c when passing through the second circuit board 161, thereby achieving the effect of electrically connecting the ground layer 111b to the capacitor elements C1 to C4.

In summary, in the embodiments of the disclosure, the set-top box is integrated with a connector module, through coordination of the shielding case, the annular capacitor and the ferrite core, the set-top box has the function of isolating the high-voltage current or the surge. That is, when the first connector of the set-top box receives a high-voltage current or a surge, the high-voltage current or surge can be guided away from the set-top box through the coordination of the annular capacitor, the ferrite core and the shielding case, and thus the related electronic components used to process or convert the signal in the set-top box, and even the media playback device connected to the set-top box are protected from the high-voltage currents or surges.

Moreover, for the set-top box, it integrates the connector module with isolation effect, which means that the user does not need to install additional electronic devices on the set-top box. Therefore, not only the usability and convenience of the product are improved, it is also possible to avoid damage to the device caused by the user due to negligence.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A connector module, adapted for a set-top box, the set-top box comprising a first circuit board, and the connector module comprising:
 a shielding case, for shielding high frequency RF signals;
 a first connector, disposed outside the shielding case, the first connector having a transmission cable penetrating the shielding case;
 an annular capacitor, disposed between the first connector and the shielding case, and electrically connected between a ground layer of the transmission cable and a grounding of the first circuit board; and at least one ferrite core, disposed in the shielding case and coupled to the shielding case to generate a mutual inductance, wherein the transmission cable penetrating the shielding case is electrically connected to a second connector of the first circuit board after penetrating the at least one ferrite core, and a high frequency signal of a peripheral cable adapted to dock the first connector is transmitted to the first circuit board through the transmission cable and the second connector.

2. The connector module of claim 1, wherein the annular capacitor comprises a second circuit board and a plurality of capacitor elements disposed thereon, the second circuit board is inserted onto the first circuit board, and at least a portion of the capacitor elements are electrically connected to the grounding.

3. The connector module of claim 2, wherein a portion of the capacitor elements is electrically connected to the grounding of the first circuit board, and another portion of the capacitor elements is electrically connected to the shielding case, and the shielding case is equipotential to the grounding of the first circuit board.

4. The connector module of claim 2, wherein the transmission cable passes through and is soldered to the second circuit board such that the capacitor elements are electrically connected to the ground layer of the transmission cable.

5. The connector module of claim 2, wherein the annular capacitor further comprises a metal elastic element sleeved on the transmission cable and electrically connected to the ground layer of the transmission cable, the transmission cable passes through the second circuit board, the metal elastic element is abutted against the second circuit board, and at least a portion of the capacitors is electrically connected to the ground layer through the metal elastic element.

6. The connector module of claim 1, further comprising: a plurality of capacitor elements disposed on the first circuit board and electrically connected between the second connector and the grounding of the first circuit board.

7. The connector module of claim 1, wherein the first connector penetrates the shielding case through the transmission cable in either of its left, right, rear or upper directions.

8. A set-top box, comprising:
a first circuit board;
a shielding case, disposed on a portion of the first circuit board for shielding high frequency RF signals;
a first connector, disposed on the first circuit board and outside the shielding case, the first connector having a transmission cable penetrating the shielding case, and a peripheral cable adapted to dock the first connector to transmit a high frequency signal to the first circuit board through the transmission cable;
an annular capacitor, disposed between the first connector and the shielding case, and electrically connected between a ground layer of the transmission cable and a grounding of the first circuit board; and
at least one ferrite core, disposed in the shielding case and coupled to the shielding case to generate a mutual inductance, and the transmission cable penetrating the shielding case being electrically connected to a second connector disposed on the first circuit board after penetrating the at least one ferrite core.

9. The set-top box of claim 8, wherein the annular capacitor comprises a second circuit board and a plurality of capacitor elements disposed thereon, the second circuit board is inserted onto the first circuit board, and at least a portion of the capacitor elements is electrically connected to the grounding.

10. The set-top box of claim 9, wherein a portion of the capacitor elements is electrically connected to the grounding of the first circuit board, and another portion of the capacitor elements is electrically connected to the shielding case, and the shielding case is equipotential to the grounding of the first circuit board.

11. The set-top box of claim 9, wherein the transmission cable passes through and is soldered to the second circuit board such that the capacitor elements are electrically connected to the ground layer of the transmission cable.

12. The set-top box of claim 9, wherein the annular capacitor further comprises a metal elastic element sleeved on the transmission cable and electrically connected to the ground layer of the transmission cable, the transmission cable passes through the second circuit board, the metal elastic element structure is abutted against the second circuit board, and at least a portion of the capacitors is electrically connected to the ground layer through the metal elastic element.

13. The set-top box of claim 8, further comprising: a plurality of capacitor elements disposed on the first circuit board and electrically connected between the second connector and the grounding of the first circuit board.

14. The set-top box of claim 8, wherein the first connector penetrates the shielding case through the transmission cable in either of its left, right, rear or upper directions.

* * * * *